W. H. McCONNELL.
SHOE POLISHING MACHINE.
APPLICATION FILED DEC. 13, 1909. RENEWED SEPT. 15, 1911.

1,024,589.

Patented Apr. 30, 1912.
8 SHEETS—SHEET 1.

Fig. 1.

WITNESSES:
W. F. Hoyle.
R. E. Barry.

INVENTOR
By William H. McConnell
Whitaker Prevost
Attorneys.

W. H. McCONNELL.
SHOE POLISHING MACHINE.
APPLICATION FILED DEC. 13, 1909. RENEWED SEPT. 15, 1911.

1,024,589.

Patented Apr. 30, 1912.
8 SHEETS—SHEET 8.

WITNESSES:

INVENTOR
BY William H. McConnell
Whitaker Prevost
Attorneys

UNITED STATES PATENT OFFICE.

WILLIAM H. McCONNELL, OF RICHMOND, VIRGINIA, ASSIGNOR TO INTERNATIONAL MACHINE CORPORATION, OF RICHMOND, VIRGINIA, A CORPORATION OF VIRGINIA.

SHOE-POLISHING MACHINE.

1,024,589.     Specification of Letters Patent.     Patented Apr. 30, 1912.

Application filed December 13, 1909, Serial No. 532,834. Renewed September 15, 1911. Serial No. 649,561.

*To all whom it may concern:*

Be it known that I, WILLIAM H. McCONNELL, citizen of the United States, residing at Richmond, in the county of Henrico and State of Virginia, have invented certain new and useful Improvements in Shoe-Polishing Machines; and I do hereby declare the following to be a full, clear, and exact description of the invention, such as will enable others skilled in the art to which it appertains to make and use the same.

My invention consists in the novel features hereinafter pointed out reference being had to the accompanying drawings which illustrate one form in which I have contemplated embodying my invention and said invention is fully disclosed in the following description and claims.

Referring to the said drawings, Fig. 2 is a top plan view of the apparatus with the casing removed, the foot rest on the left side of the machine being also removed, together with the brushes, the driving shafts for which are shown in section.

In the drawings 1 represents a base plate or bed which I preferably employ and which is constructed to receive and support upon a common base all the various parts of the mechanism, the said base plate being preferably of skeleton form in order to avoid waste of metal. Upon the forward portion of the base plate 1 are arranged two parallel supporting frames 2, 2, each of which is provided with a single shoe support and with instrumentalities including a plurality of traveling brush carriages provided with brushes, and means for securing the desired travel of the said carriages and the desired operation of the said brushes, for the purpose of cleaning and polishing a single shoe. As the said supporting frames 2, 2 and the mechanism associated therewith are identical in construction and operation, a description of one of said frames and its associated parts will describe both.

Each of the supporting frames 2 is provided with an endless track for guiding the brush carriages during their travel around the adjacent shoe support 3. This track comprises an upper track rail which extends downwardly from the upper track frame 4 and a lower track rail which extends upwardly from the lower track frame 5. The lower track frame 5 is supported by suitable brackets or otherwise from the base plate 1 and at some distance above the base plate and the track frame 4 is supported directly above and suitably spaced from the lower track frame 5. Obviously these parts of the supporting frame may be formed integrally or may be formed separately and connected together in any suitable manner, as may be found most convenient in the construction and assembling of the machine. The upper track rail which depends from the upper track frame 4 comprises the longitudinal parallel track rails 4ª and the curved track rails 6ª at each end of and connecting said parallel track rails 4ª, the said curved track rails being carried by substantially semicircular extension pieces 6 forming the front and rear end portions of the upper track frame 4. The lower track frame 5 is correspondingly provided with parallel longitudinal track rails 5ª and curved track rails 7ª extending upwardly from the lower track frame, the curved track rails 7ª being formed on substantially semi-circular extensions 7, forming the front and rear end portions of the lower track frame.

Figure 1:
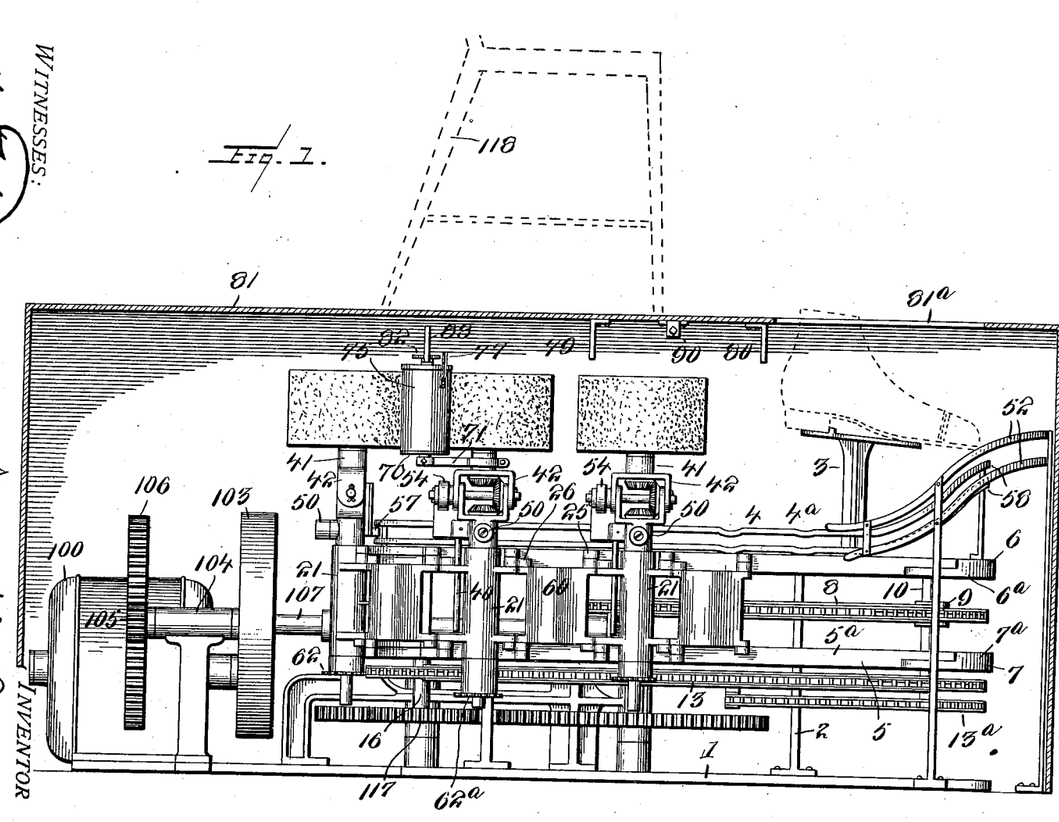
Figure 1 represents a side elevation of an apparatus embodying my invention, the exterior casing being shown in section.
Figure 3:
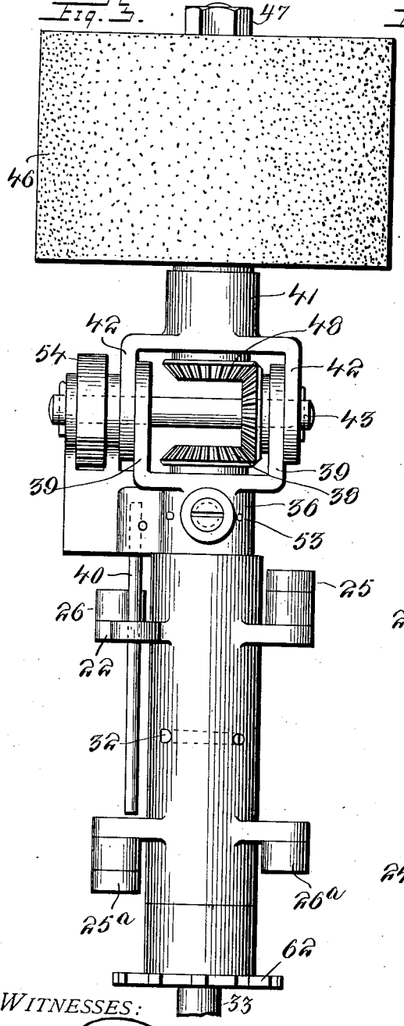
Fig. 3 is an elevation of one of the complete brush carriages detached from the machine, with the brush carried thereby.
Figure 9:
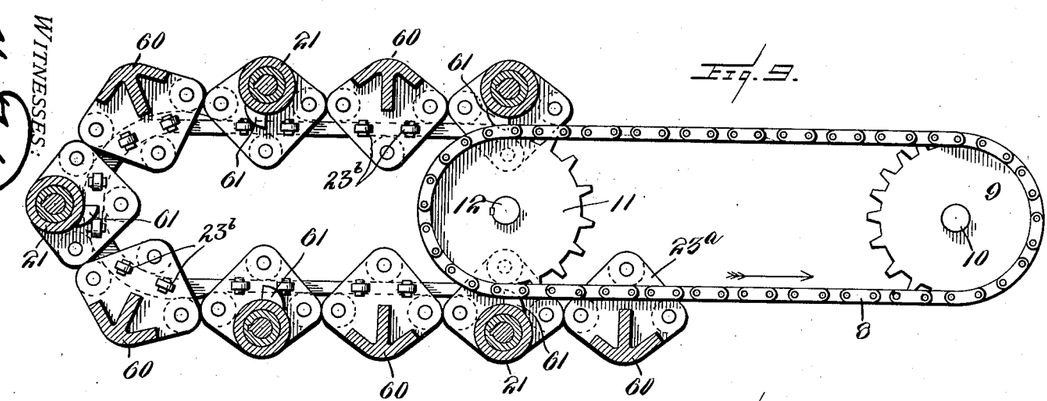
Fig. 9 is a diagrammatic plan view of one side of the machine showing the endless carrier for propelling the brush carriages and illustrating the carriage frames, and idler frames in section.

Substantially midway between the upper and lower track frames is an endless carrier consisting in this instance of a sprocket chain, which is supported at the front end of the supporting frame by a sprocket wheel 9 on an idle shaft 10, which is mounted in suitable bearings in the extensions 6 and 7 of the track rail frame and the said carrier, which is indicated at 8, is supported at its rear end by a sprocket wheel 11, the same being the driving sprocket, mounted on a vertical shaft 12 supported in bearings in the supporting frame about midway between the ends thereof, see Figs. 1, 2 and 9. The links of the carrier or sprocket chain 8 with which the teeth of the sprocket wheels 9 and 11 engage, are of greater width vertically than the said teeth as shown in Fig. 1 and also in Fig. 11, for a purpose hereinafter more fully explained.

Figures 11, 12:
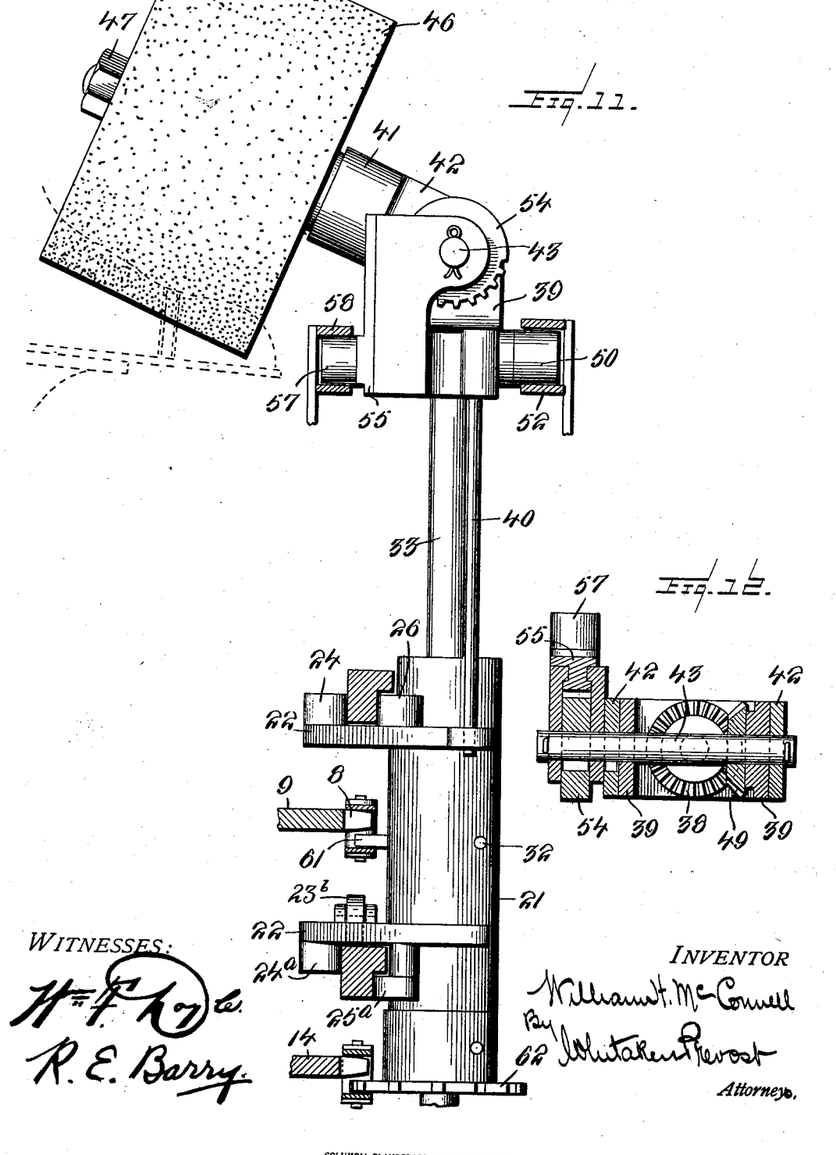
Fig. 11 is a detail view representing one of the brush carriages as it appears when passing around the front end of the endless track, with the brush supporting device elevated and the brush carried thereby depressed into contact with the top of the shoe, the adjacent parts being illustrated in section.
Fig. 12 is a horizontal sectional view on line 12—12 of Fig. 5.

Below the lower track frame 5 is an endless driving belt consisting in this instance of a sprocket chain 13 supported at the front end of the machine by a sprocket wheel 14 on the idle shaft 10 before referred to and at the rear end of the supporting frame 2 by a sprocket wheel 15, on a vertical shaft 16 mounted in the supporting frame concentrically with the rear curved track rails 6ª and 7ª. This driving sprocket chain 13 also has the links of the same which engage the teeth of sprocket wheels 14 and 15, of greater width than the said teeth, as shown in Figs. 1 and 11, for a purpose hereinafter more fully explained.

Figure 16:
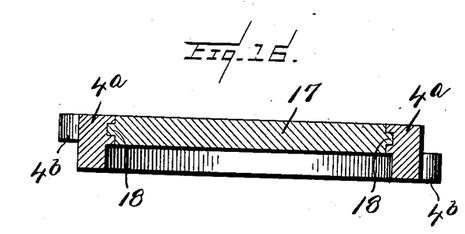
Fig. 16 is a transverse vertical section of the forward end portion of the upper track shown in Fig. 6.

The idle shaft 10 at the front end of the supporting frame 2, is adjustable in a forward direction for the purpose of keeping the sprocket chains 8 and 13 at the proper tension. To this end the semi-circular extensions 6 and 7 of the upper and lower track frames are each secured to a horizontally disposed adjustable block 17 provided with lateral guiding portions 18 which have a sliding engagement with grooved portions of the parallel rail sections 4ª, 5ª, as indicated in dotted lines in Fig. 2 and as more clearly shown in Fig. 16. The upper and lower track frames are each provided with adjusting screws 19, engaging the rear faces of the blocks 17, 17 and by turning said screws the said blocks and the extensions 6 and 7 can be adjusted longitudinally of the supporting frame 2, carrying with them the shaft 10, which can thus be adjusted to the desired position to hold the sprocket chains taut.

Figure 17:
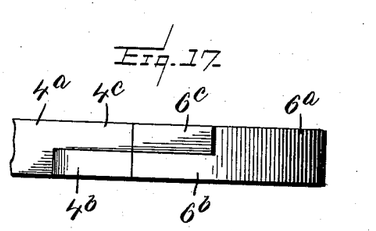
Fig. 17 is a side elevation of the upper track frame near the forward end portion, as shown in Fig. 6.
Figure 18:
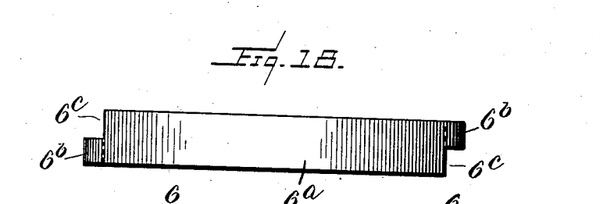
Fig. 18 is a front elevation of the curved portion of the upper track frame.
Figure 19:
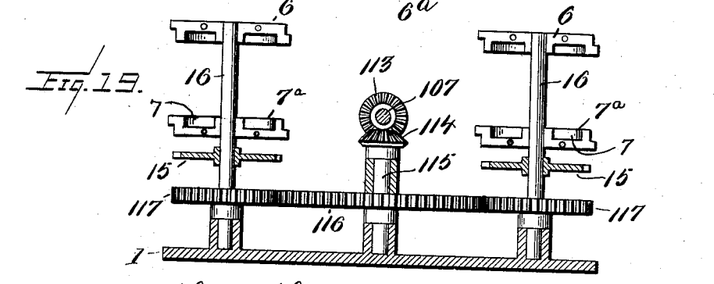
Figs. 19 and 20 are transverse vertical sectional views on lines 19—19 and 20—20 of Fig. 2, the brush carriages and chains being removed.
Figure 20:
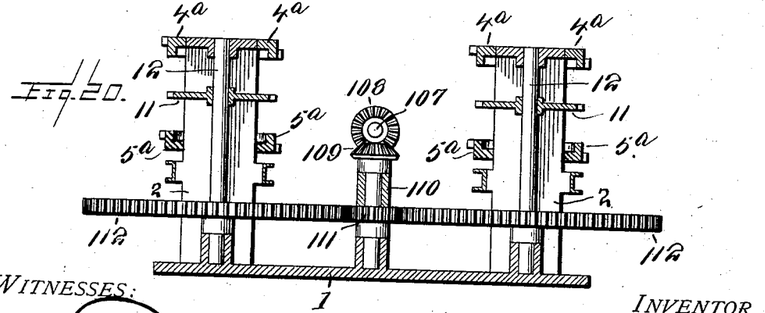

Upon the endless track previously described, a plurality of brush carriages are placed, preferably five in number. These brush carriages are exactly the same in construction and operation, except for certain features which characterize the dauber brush carriage and which will be referred to in detail hereafter, and therefore a description of one of said brush carriages will suffice for all. Each of the brush carriages, one of which is illustrated in detail in Figs. 3, 4, 5 and 11, is provided with a carriage frame 20, shown in detail in Figs. 6, 7 and 8, and comprising a bearing sleeve 21 provided with horizontally disposed upper and lower brackets or flanges 22 and 23, the same carrying guiding projections, preferably in the form of friction rollers, which engage the upper and lower track rails, as hereinafter described, and guide the carriage in its travel around the endless track. Each of said flanges or brackets is provided with three of said guiding projections or rollers, an inner roller 24 which engages the inner face of the track and is preferably located in a central position with respect to the axis of the sleeve 21, or in other words, a line connecting the centers of said sleeve and said inner roller, will be disposed transversely to the line of travel of the carriage. Each of the brackets or flanges is also provided with two exterior rollers 25 and 26 which engage the outer face of the track rails and are disposed at substantially equal distances on opposite sides of a line connecting the centers of the roller 24 and the sleeve 21. For convenience of reference, I will refer to the roller 25, which is on the forward side of said line, as the front or leading roller and the roller 26 as the rear roller. The front and rear rollers are located in different horizontal planes, so that they engage different portions of the exterior face of the track rail. In the present instance the front or leading roller 25 of the upper bracket 22 is located above the horizontal plane of the rear roller 26, the said leading roller having a reduced or cut away stem portion 25ᵇ, as shown in Fig. 8. The curved track portion 6ª at each end of the upper track rails, is of greater thickness than the track rails 4ª, as shown in Fig. 6 and each of said track rails 4ª is provided with an exterior boss 4ᵇ at each end, the exterior surface of which is concentric with the exterior surface of the curved portion 6ª. These bosses do not extend, however, the full width of the exterior vertical face of the track rails 4ª, as shown in Figs. 6 and 17, Fig. 6 showing the form of the upper track at the front end of the machine and Fig. 17 a side view thereof, thus on the right hand side of the upper track rail (looking toward the front of the machine from the rear thereof) the boss 4ᵇ is adjacent to the lower edge of the track rail 4ª and forms a continuation of the adjacent portion 6ᵇ of the track 6ª. The curved track 6ª is cut away, as indicated at 6ᶜ to form a straight face in line with the adjacent straight portion 4ᶜ of the rail 4ª above the curved portions 4ᵇ, 6ᵇ. The construction of the corresponding parts at the left hand side of the track, see Fig. 6, is the converse of this construction previously described, the boss 4ᵇ being adjacent to the upper face of the track and the curved rail 6ª having the straight face 6ᶜ adjacent to its lower edge in line with the portion 4ᶜ of the track rail 4ª. The construction of the curved track rail 6ª at the rear end of the upper track frame 4 is exactly the same as that shown in Fig. 6 and the construction of the lower track rails 5ª, 7ª is exactly the same as the construction of the upper track rails 4ª, 6ª. The lower bracket 23 of the carriage frame is provided on its lower face with three guiding projections or rollers 24ª, 25ª and 26ª, the roller 24ª engaging the inner face of the track rail and the rollers 25ª and 26ª engaging the exterior face of the track rail and being located in different horizontal planes, the arrangement of the three rollers on the lower bracket 23 corresponding to that of the rollers on the bracket 22 if the latter bracket were inverted. The lower bracket is also provided with vertical rollers 23ᵇ engaging the top face of the track.

The object of the construction just described is to guide the carriage frame accurately in making the turns at the end portions of the endless tracks so as to maintain the carriage frame at all times in definite relation to the part of the track which it engages, or in other words to hold it at all times so that a line connecting the centers of the inside roller 24 and the sleeve 21, will be substantially perpendicular to the direction of travel of the carriage frame. Referring to Fig. 6, I will now describe in detail the manner in which this is accomplished with reference to the three rollers on the upper bracket 22 in passing around the curved portion 6ª at the front end of the upper track, in the direction indicated by the arrow, it being understood that this description applies also to the turn at the rear end of the upper track and that the corresponding guiding actions occur on the lower track which is engaged by the guiding rollers of the lower bracket.

In Fig. 6 I have shown a carriage frame in three different positions which it occupies in making the turns. In the first or lower position, the inner roller 24 is in engagement with the inner face of the track rail 4ª; the exterior leading roller 25 has passed above the boss 4ᵇ along the straight portion 4ᶜ of the rail 4ª and the straight portion 6ᶜ of the cut away part of the curved rail 6ª; the rear exterior roller 26, which is on a lower plane than that of the leading roller 25, is approaching the curved boss 4ᵇ. This position of the parts is also illustrated in side elevation in Fig. 17. The forward movement of the carriage in the direction of the arrow, it will be seen, will cause the leading roller 25 to pass from the straight face 6ᶜ to the outer curved face of the rail 6ª at the same instant that the rear roller 26 passes from the straight outer face of the rail 4ª to the curved outer face of the boss 4ᵇ, thus maintaining the carriage frame in its proper relation to the direction of travel as well upon the curved part of the track as upon the straight, the additional thickness of the curved part 6ª preventing any looseness or play which would result if the curved part of the rail were made of the same thickness as the straight rail section 4ª. The right hand position in Fig. 6 shows the position occupied by the carriage frame in the central portion of the curved track rail 6ª and the upper position in Fig. 6 shows the carriage frame in the position which it occupies when leaving the curved portion 6ª. In this latter position it will be observed that the leading roller 25 has engaged the straight outer face of the straight rail section 4ª, at the same instant that the rear roller 26 has engaged the straight cut away portion 6ᶜ, of the curved rail 6ª, so that the further movement of the carriage frame will cause the rear roller 26 to pass beneath the curved portion 6ᵇ and the boss 4ᵇ on that side of the track. It will thus be seen that throughout the travel of the carriage frame from a straight portion of the track around the curved portion 6ª to the other straight portion, and throughout its travel along the straight portions of the track, the carriage frame is always maintained and guided and held in a position definite with respect to the line of travel.

Within the bearing sleeve 21 of the carriage frame, is a rotatable sleeve 30 which preferably extends below the end of the bearing sleeve. This rotating sleeve is held from vertical movement in the bearing sleeve and to this end I prefer to provide the rotating sleeve 30 with an annular groove 31 which is engaged by a pin 32 extending through a hole drilled through the bearing sleeve 21 in line with said groove, as clearly shown in Figs. 3 and 4. This pin is what is termed a taper pin, being slightly tapered from one end to the other and when driven in place in the bearing sleeve holds the rotary sleeve 30 from vertical movement, but permits its rotation.

A brush supporting device is provided in connection with the carriage frame and comprises the following parts. 33 represents a vertically movable shaft which extends through the rotary sleeve 30, but is connected to rotate therewith by a spline or feather engaging a groove or key way 34 in the shaft. The upper end of the shaft 33 is reduced as indicated at 35, said reduced portion having a bearing in a head block 36 which is preferably provided with a bushing 37 fitted therein and surrounding the shaft. The upper end of the shaft 35 carries a miter gear 38 and the head block 36 is provided with two upwardly extending arms 39 forming a yoke. The head block 36 is maintained at all times in a predetermined relation with the carriage frame while being permitted to move vertically with respect thereto. In the drawings I have shown the said head block provided with a guide rod 40 which extends downwardly therefrom and has a sliding engagement with a guiding aperture in the upper bracket 22 of the carriage frame, as clearly shown in Figs. 3 and 5. Above the head block 36 is a pivoted brush carrier which comprises a sleeve 41 having downwardly extending arms 42 forming a yoke, said arms being pivotally connected to the arms 39 of the head block by a pivot bolt 43. A brush shaft 44 extends through the sleeve 41 which is preferably provided with a bushing 45 for said shaft and said brush shaft 44 is provided with a brush 46 detachably secured thereto by means of a nut 47, said brush being composed of bristles, felt or other suitable material, as may be preferred. The lower end of the shaft 41 carries a miter gear 48 and an idle miter gear 49 is mounted on the pivot bolt 43 loosely and meshes with the miter gears 38 and 48.

The head block 36 is provided with a lifting stud, preferably in the form of a friction roller 50, projecting from the outer face of the head and secured in position by a screw 51, this roller being adapted to engage a suitable cam track or rail 52, provided at the front of the machine and extending around the foot rest 3 for the purpose of elevating the brush supporting device at that portion of its travel and lowering it again to its normal position after it has passed around the toe of the shoe.

Figure 4:
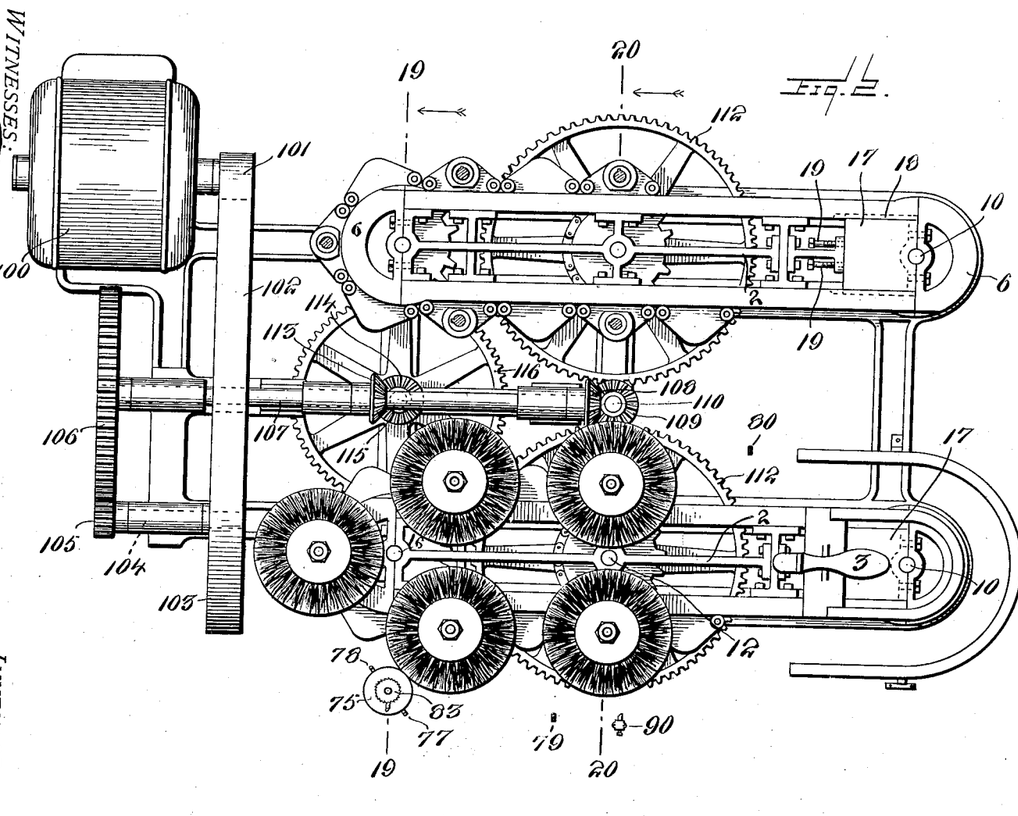
Fig. 4 is a vertical sectional view of the same.
Figures 5, 6, 7, 8:
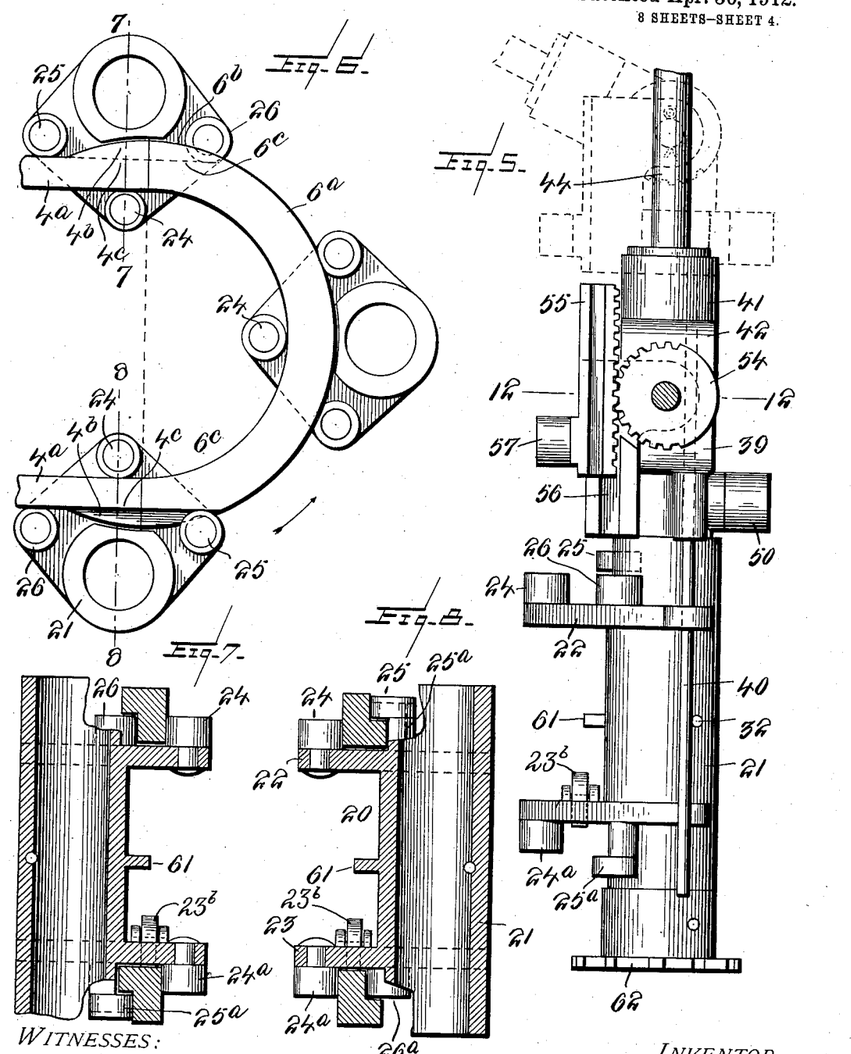
Fig. 5 is a side elevation of one of the brush carriages with the brush removed.
Fig. 6 is a diagrammatic top plan view of the curved portion at the end of one of the endless tracks, showing a carriage frame, and its guiding rollers in three different positions in relation therewith.
Fig. 7 is a vertical sectional view on line 7—7 of Fig. 6.
Fig. 8 is a vertical sectional view on line 8—8 of Fig. 6.

53, Fig. 4, represents a tapered pin which extends through suitable apertures in the head and engages notches in the bushing 37 and screw 51 to lock the same in position.

I also provide mechanism for positively tilting the brush carrier and brush at certain parts of the travel of the brush carriage and to this end I provide the yoke of the brush carrier with a pinion 54 (in this instance a mutilated pinion) which is secured to one of the arms 42 of the yoke and engages a vertically movable rack bar 55 having a sliding engagement with the head block 36. In this instance the head block is provided with a dovetailed groove 56 which receives the sliding bar 55 and said bar is provided with a controlling projection in the form of a friction roller 57 projecting on the inner side of the head block in position to engage a cam track 58 extending around the shoe support 3 within the outer cam track 52, and which may be extended entirely around the upper track frame. The normal position for the brush carrier is a vertical position, as indicated in full lines in Fig. 5 in which the head block is shown in its lowest position resting upon the top of the rotary driving sleeve 30 and it will be seen that any downward movement of the rack bar 55 will cause the brush carrier to tilt inwardly toward the shoe support or to the left in Fig. 5. The cam track 58, which engages the friction roll 57 on the rack bar 55, is so constructed that as the brush carriage is moved toward the front of the machine, the friction roll 57 and rack bar 55 will be depressed by the cam track 58 as the brush approaches the heel portion of the shoe rest, causing the brush to incline inwardly and sweep the rear portion of the heel of the shoe on the shoe support which is to be cleaned and polished. The cam track will then raise the friction roll 57, restoring the brush carrier to a vertical position as it passes along the side of the heel portion of the shoe. The cam track 58 is provided with a depressed portion to depress the roll 57 and the rack bar 55 at the instant that the brush comes opposite the concave portion of the shoe under the instep, so as to cause the brush to tilt inwardly and sweep that portion of the shoe and the brush is then returned to a vertical position or nearly vertical position as it passes along the side of the foot portion. The outer roller 50 will then engage the outer cam track 52, thus raising bodily the brush supporting device toward the position indicated in dotted lines in Fig. 5 and full lines in Fig. 11. The inner cam track 58 will also be provided with a rising grade from this point to a point opposite the toe of the shoe, or toe portion of the foot support but the rise of the inner cam track 58 will not be so great as the rise of the outer cam track 52, the differential between the grades of the inner and outer cam tracks acting to depress the friction roller 57 and rack bar 55 with respect to the head block 36 and causing the pivoted brush support to tilt downwardly toward the toe portion of the shoe until it passes around the toe portion where the cam tracks 58 and 52 are provided with corresponding descending grades engaging the rollers 50 and 57, the differential between which gradually restores the brush carrier to a vertical position as the head block is moved downward to its normal position. The inner cam track 52 on the left hand side of the shoe support, is provided with depressed portions as heretofore described with respect to the outer or right hand portion of the cam track, to act upon the friction roller 57 and tilt the brush carrier toward the shoe support as it passes the central portion of the foot and as it passes the rear part of the heel. By properly forming these cam tracks 52 and 58, it will be seen that the brush carrier is under control at all times and is positively tilted toward and from the shoe on the shoe support and positively raised and lowered as it passes around the toe portion thereof, thus enabling the brush to sweep every portion of the shoe which is to be polished. I prefer to provide both cam tracks 52 and 58 with double rails one above and one below the friction rollers 50 and 57 respectively, as clearly shown in the drawings, see particularly Figs. 1 and 11, so that the movements produced upon said head block and brush carrier, shall be positive in both directions. This construction obviates the use of springs or other yielding devices and enables the position of the brush to be positively controlled at all times when it is in contact with the surface to be polished.

In assembling the parts of the machine I prefer to employ five brush carriers on each of the supporting frames, as shown in the drawing and these are placed placed in position with the carriage frames thereof in sliding engagement as heretofore described with the upper and lower track rails of the supporting frame. I also provide means for properly spacing the brush carriages and at the same time enabling a bumping action to be transmitted to them for the purpose of moving them around the rear end, or what I call the dead portion, of the endless track, by which term I mean the portion of the track to the rear of a transverse line passing through the axis of the vertical shaft 12, see Fig. 9. This could be accomplished in many ways, but on account of the sharpness of the curved portion of the track, I prefer to place upon the track adjacent to each one of the brush carriages, an idle device which I term a bumper or bumper frame, illustrated at 60 and which consists of a metal frame or shell provided with top and bottom flanges 22ª and 23ª corresponding exactly to the shape of the flanges 22 and 23 of the carriage frame and provided with guiding rollers 24, 25 and 26 and supporting rollers 23ᵇ in exactly the same manner as are said carriage frames. These bumpers carry no mechanism and perform no function except to lie between adjacent brush carriages and communicate motion from one to the other, as hereinafter explained.

For the purpose of enabling the several brush carriages to be moved around the forward portion of the track, each of said carriages is provided with a tooth or lug 61 to engage the open links of the sprocket chain conveyer 8 below the plane of the teeth of the sprocket wheels 9 and 11, as shown in Fig. 11. As before described the open links of the chain 8 are of greater width than the teeth of the sprocket wheels, thus permitting the engagement of the teeth 61 of the brush carriages as just described, and this construction enables the teeth 61 to remain in engagement with the chain while passing around the forward sprocket wheel 9 and to engage and disengage the chain adjacent to the sprocket wheel 11 without interfering with the teeth of said sprocket wheels.

The parts are so constructed and arranged that supposing the teeth 61 of two brush carriages engage the sprocket chain 8 on opposite sides of the sprocket wheel 11, the dead portion or rear portion of the track is just sufficient to accommodate the remaining brush carriages and intervening bumpers, as clearly shown in Fig. 9. This actually represents the position of the parts when the machine is at rest. When the machine is started and power is applied to the sprocket chain 8 or carrier, the first brush carriage on the right hand side will be moved along the track by the carrier, pushing its bumper ahead, passing around the front part of the supporting frame and thence rearward until its bumper strikes brush carriage No. 5, when brush carriages Nos. 5, 4, 3 and 2 will be moved around the dead portion of the track until the tooth 61 of brush carriage No. 2 is forced into engagement with the carrier or chain 8. The brush carriage No. 2 will then be carried around in the same manner as No. 1, and so on until all of the brush carriages have been carried around the shoe support, when the machine will be stopped by hand or automatically as preferred.

Figure 10:
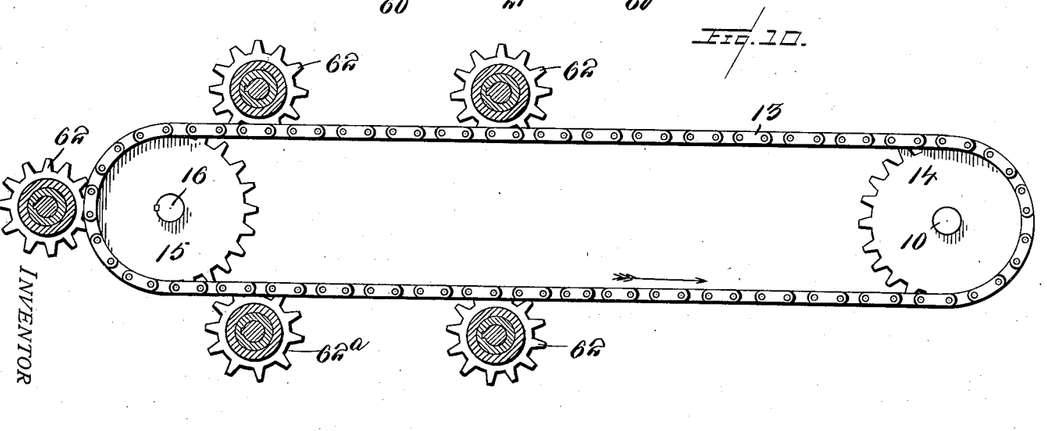
Fig. 10 is a similar view showing the endless driving chain, and the driving sprockets carried by the several carriages in engagement therewith, the carriages being shown in section.

Any desired arrangement of the brush carriages may be carried out, but in the present instance it will be understood that the first carriage will carry a cleaning brush, the second carriage a dauber brush and the third, fourth and fifth carriages will carry polishing brushes, which may be either of bristles or felt or other suitable material. Each of the brush carriages, except the one carrying the dauber brush has its rotating sleeve 30 provided at its lower end with a driving pinion 62, the teeth of which engage the links of driving chain 13 below the plane of the teeth of sprocket wheels 14, 15, so as not to interfere therewith, said chain being driven continuously during the operation of the machine and driving all the brushes at a high rate of speed, see Fig. 10. I do not consider it desirable to drive the dauber brush, except during the time that it is in contact with the shoe, as otherwise a waste of the blacking paste would result and I, therefore, provide the lower end of the driving sleeve of the dauber brush with a driving pinion 62ª below the plane of the chain 13 and in the plane of a stationary chain 13ª, (or rack) secured to the supporting frame and extending around the front of the same parallel with the front portion of the chain 13. As the dauber carriage is moved around in its turn, the pinion 62ª will engage the stationary chain 13ª and rotate the brush sufficiently for the application of the paste or blacking, which can be supplied thereto in any desired way.

Figure 13:
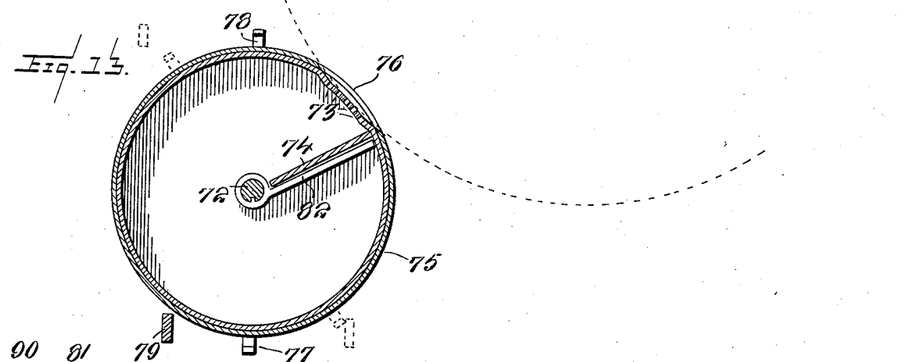
Figs. 13, 14 and 15 are detail views representing the blacking reservoir and coöperating parts.
Figures 14, 15:
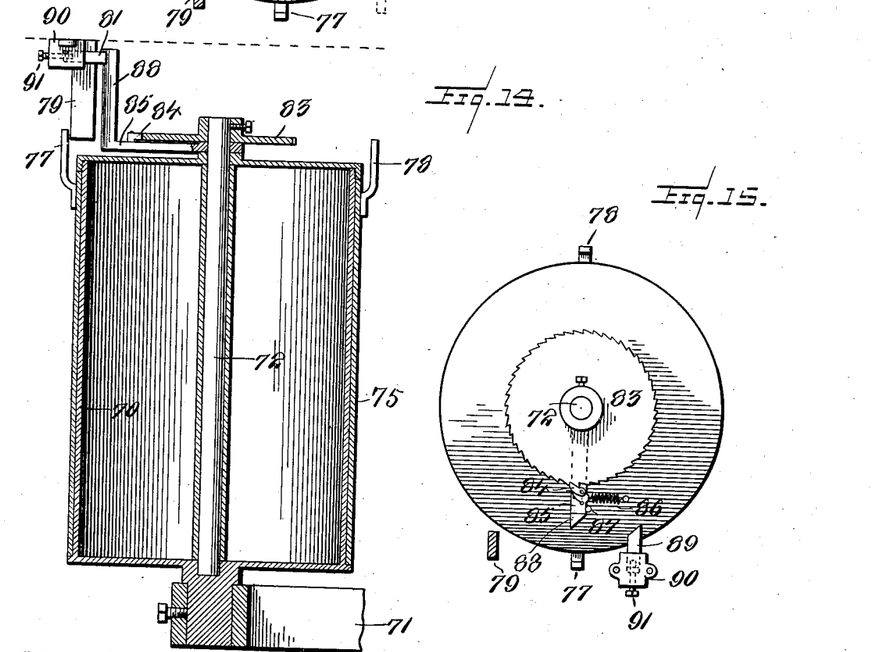

In the drawings, see particularly Figs. 1, 13, 14 and 15, also Fig. 2, I have shown a cylindrical paste receptacle 70 carried on an arm 71 secured to the sleeve 41 of the dauber brush carriage and provided with a vertical shaft 72 extending centrally therethrough. The receptacle 70 is provided on the side nearest the dauber brush, which is indicated in dotted lines in Fig. 13, with a plurality of vertical slits 73 through which the blacking paste may exude or be pressed and the receptacle is provided preferably with a stationary radial partition 74 adjacent to one side of these slits. In order to prevent the blacking paste from drying up in the slits or in the receptacle when the machine is not in operation, I provide a slide for closing the slitted portion of the casing when the dauber brush is not in use, which consists in this instance of an annular casing 75 surrounding the receptacle 70 and capable of rotation thereon, said casing having an open portion 76 of slightly greater width than the slitted portion of the casing and which is capable of being moved into registration therewith to permit the brush to sweep across the slitted portion of the casing, as indicated in Fig. 13. This casing is given a partial rotation by suitable means, so as to uncover the slitted portion of the receptacle 70 at the same time that the dauber brush begins to operate and to close the receptacle as soon as the dauber brush has ceased to operate. In the present instance the casing is provided with upwardly extending projections 77 and 78 on opposite sides thereof which are momentarily engaged by stationary projections 79 and 80 respectively, which in the present instance depend from the top of the inclosing casing 81 which incases the entire apparatus and is shown in section in Fig. 1, the said projections 80 and 79 being located at proper points in the path of the dauber carriage to produce this result, as indicated in Fig. 2. I also provide means for automatically feeding the paste through the slits 73 which consists in this instance of a blade 82 secured to the central shaft 72 of the paste receptacle and adapted to be rotated within the receptacle, as shown in Fig. 13, the said blade acting in conjunction with the stationary radial partition 74 to force the paste through the slits 73. Any suitable means may be employed for operating said blade. I have shown for this purpose a ratchet wheel 83 secured to the shaft 72 and engaged by a pawl 84 carried on a loose arm 85 pivoted on the shaft 72 and held by a spring 86 against the stop 87 on the top of the receptacle 70. The loose arm 85 has a vertically extending portion or projection 88 in the path of an adjustable trip 89 mounted in a bracket 90, secured to the top of the casing 81 at a desired point, preferably a little in rear of the shoe support, as shown in Fig. 2. This strip 89 is adjustable by means of a set screw 91, so as to actuate the arm 85 more or less, as its projection 88 passes the same, thus slightly advancing the blade 82 in the direction of the arrow, Fig. 13, every time the dauber carriage is made to travel around the shoe support.

The apparatus heretofore described, is preferably operated by an electric motor 100, mounted on the bed plate 1, although it may be driven in other ways. In this instance, the motor armature is provided with a pulley 101 connected by a belt 102 with a band wheel 103 on a short countershaft 104, which has a pinion 105 on its other end engaging a gear wheel 106 on a longitudinal shaft 107 extending between the two supporting frames for driving the operated parts of both. In order to drive the two carriers or chains 8, 8, the shaft 107 is provided at its forward end with a bevel pinion 108, engaging a bevel pinion 109 on a vertical shaft 115, which carries a gear end a pinion 111 which meshes with two large gear wheels 112, 112, each of which is mounted upon the vertical shaft 12 of one of the supporting frames, thus transmitting power to the sprocket chains 8, 8. The shaft 107 is also provided with a bevel gear 113, meshing with the bevel gear 114 on a vertical shaft 115, which carries a gear wheel 116 meshing with two smaller gear wheels 117, each of which is mounted upon the shaft 16 of one of the supporting frames, thus transmitting motion to the driving chains 13, 13.

In the operation of the machine, it is to be understood that the person whose shoes are to be shined, will preferably seat himself on a seat or chair 118 indicated in dotted lines in Fig. 1 and mounted on the top of the inclosing casing 81, placing both feet upon the shoe supports 3, 3, suitable openings 81ᵃ being provided in the casing for that purpose. The apparatus is put in motion by starting the motor 100 through the means of a suitable switch, which may be controlled by hand or which may be controlled and operated by coin actuated mechanism (not shown) in any usual or desired manner. The operation of the brushes of both supporting frames will be the same, as hereinbefore described, and the corresponding brushes of both supporting frames will be simultaneously actuated, thus cleaning, applying paste or blacking to, and finally polishing both shoes simultaneously.

What I claim and desire to secure by Letters Patent is:—

1. In a shoe polishing machine, the combination with a shoe support, of a traveling brush carriage, rigid guiding means for said carriage extending around the shoe support, a vertically disposed rotatable part mounted in said carriage, a vertically disposed rotatable brush carrier operatively connected therewith and mounted upon a horizontal pivot, devices for changing the relative horizontal positions of the shoe support and the brush carrier, during a portion only of the travel of said carriage and stationary devices located adjacent to a part only of the travel of the carriage, for engaging a part connected with the brush carrier, and positively rocking it toward and from the shoe support.

2. In a shoe polishing machine, the combination with a shoe support, of a traveling brush carriage, rigid guiding means for said carriage extending around the shoe support, a vertical, vertically movable, rotatable part mounted in said carriage, a brush carrier connected thereto by a horizontal pivotal connection and operatively connected for rotation therewith, means for moving said vertical part and the brush carrier vertically, means for positively rocking said brush carrier toward and from the shoe support and means for driving said vertical part to effect the rotation of the brush carrier.

3. In a shoe polishing machine, the combination with a shoe support, of a traveling brush carriage, rigid guiding means for said carriage extending around the shoe support, a vertical, vertically movable, rotatable part mounted in said carriage, a brush carrier connected thereto by a horizontal pivotal connection and operatively connected for rotation therewith, means for moving said vertical part and brush carrier vertically, means for holding said brush carrier at all times with its horizontal pivotal connection in line with its path of travel around the shoe support, means for positively rocking the brush carrier toward and from the shoe support, and driving means for the said vertical part.

4. In a shoe polishing machine, the combination with a shoe support, of a traveling brush carriage, rigid guiding means for said carriage extending around the shoe support, a vertical, vertically movable, rotatable part mounted in said carriage, a brush carrier connected thereto by a horizontal pivotal connection and operatively connected for rotation therewith, means for moving said vertical part and the brush carrier vertically, means for holding said brush carrier at all times with its horizontal pivotal connection in line with its path of travel around the shoe support, a stationary cam and a horizontal part extending from the brush carrier and engaging said cam for rocking the same toward and from the shoe support.

5. In a shoe polishing machine the combination with a shoe support, a traveling brush carriage, means for guiding the brush carriage around the shoe support, said brush carriage being provided with a vertically disposed brush carrier mounted upon a horizontal pivot, a vertically disposed rotary brush on said brush carrier, a stationary lifting cam track for elevating the brush carrier with respect to the other portions of the brush carriage, a part connected with the pivoted brush carrier for rocking the same toward and from the shoe support, and provided with a cam engaging portion, and a second stationary cam track adjacent to the first mentioned cam track for engaging the said cam engaging portion.

6. In a shoe polishing machine the combination with a shoe support, a traveling brush carriage, means for guiding the brush carriage around the shoe support, said brush carriage being provided with a vertically disposed brush carrier mounted upon a horizontal pivot, a vertically disposed rotary brush on said brush carrier, a pinion secured to said pivoted brush carrier, a vertically sliding rack engaging said pinion, and provided with a cam track engaging projection, and a stationary cam track for engaging said projection to rock the brush carrier toward and from the shoe support.

7. In a shoe polishing machine the combination with a shoe support, an endless track surrounding the same, a traveling carriage frame engaging said track, a vertically movable brush support, mounted on said carriage frame, and provided with a vertically disposed pivoted brush carrier mounted on a horizontal pivot, means for holding the brush carrier with its horizontal pivot in fixed relation with the line of travel of the carriage frame, means for raising and lowering the brush supporting device with respect to the carriage frame, and means for rocking the brush carrier toward and from the shoe support.

8. In a shoe polishing machine the combination with a shoe support, an endless track surrounding the same, a traveling carriage frame engaging said track, a vertically movable brush support mounted on said carriage frame, and provided with a vertically disposed pivoted brush carrier mounted on a horizontal pivot, means for holding the brush carrier with its horizontal pivot in fixed relation with the line of travel of the carriage frame, a stationary lifting cam track, a projection on the brush supporting device for engaging said cam track, devices for rocking the brush carrier upon its horizontal pivot including a cam engaging projection connected with the brush carrier, and a second stationary cam track for engaging said projection.

9. In a shoe polishing machine, the combination with a shoe support, an endless track surrounding the same, a traveling brush carriage frame engaging said track, a rotary part carried thereby and provided with a driving wheel, a brush supporting device provided with a vertically disposed brush supporting device pivotally mounted on a horizontal pivot, a rotary brush carried thereby, connections between the rotary brush and said rotary part on the carriage frame, and an endless driving chain engaging said driving wheel and extending adjacent to said endless track throughout its entire extent, the said driving wheel being at all times in engagement with said driving chain.

10. In a shoe polishing machine, the combination with a shoe support, an endless track surrounding the same, a traveling brush carriage frame engaging said track, a rotary part carried thereby and provided with a driving wheel, a brush supporting device provided with a vertically disposed brush carrier pivotally mounted on a horizontal pivot, a rotary brush carried thereby, connections between the rotary brush and said rotary part on the carriage frame, and an endless driving chain engaging said driving wheel and extending adjacent to said endless track throughout its entire extent the said driving wheel being at all times in engagement with said driving chain, and means for driving said driving chain continuously during the operation of the machine.

11. In a shoe polishing machine the combination with a shoe support, of an endless track surrounding the same, a plurality of brush carriages engaging said track and provided with rotary brushes, each of said carriages being provided with a driving wheel operatively connected with its rotary brush, an endless driving device co-extensive with said track and engaging the driving wheels of a plurality of said brush carriages, an endless carrier of less extent than the said track, means for driving said carrier, means on each carriage for engaging said carrier, and a plurality of bumpers interposed between said carriages and independent of them for transmitting motion from a carriage in engagement with said carrier to the other carriages.

12. In a shoe polishing machine the combination with the shoe support, of an endless track surrounding the same, a plurality of carriages mounted thereon, an endless carrier having portions of less extent than said track adjacent thereto, a device on each carriage for engaging said carrier, and devices between said carriages for transmitting motion from a carriage in engagement with said carrier to the other carriages, said devices being provided with independent guiding means engaging said track.

13. In a shoe polishing machine the combination with the shoe support, of an endless track surrounding the same, a plurality of carriages mounted thereon, an endless carrier having portions of less extent than said track adjacent thereto, a device on each carriage for engaging said carrier, and a plurality of traveling bumpers provided with independent guiding means engaging said track and having portions at each end to strike the adjacent carriages, said bumpers being each located between two adjacent carriages.

14. In a shoe polishing machine the combination with a shoe support, of an endless track surrounding the same, a traveling brush carriage frame mounted on said track, a rotary driving sleeve carried thereby, and provided with a driving wheel, a vertically movable head block, means for holding said head block from turning with respect to the carriage frame, a pivoted brush carrier connected to said head block by a horizontal pivot disposed in line with the travel of the carriage frame, and having a rotary brush shaft, a vertical shaft connecting said brush shaft with the rotary driving sleeve, a lifting projection on said head block, a stationary lifting cam track for engaging said projection, and means for imparting motion to said driving wheel.

15. In a shoe polishing machine the combination with a shoe support, of an endless track surrounding the same, a traveling brush carriage frame mounted on said track, a rotary driving sleeve carried thereby, and provided with a driving wheel, a vertically movable head block, means for holding said head block from turning with respect to the carriage frame, a pivoted brush carrier connected to said head block by a horizontal pivot disposed in line with the travel of the carriage frame, and having a rotary brush shaft, a vertical shaft connecting said brush shaft with the rotary driving sleeve, a pinion secured to said pivoted brush carrier, a vertically movable rack bar in said head block engaging said pinion, a cam engaging projection on said rack bar, means for moving said head block vertically with respect to the carriage frame, and a cam track for engaging said projection.

16. In a shoe polishing machine the combination with a shoe support, of an endless track surrounding the same, provided with parallel straight rail portions and curved end rail portions, a traveling brush carriage provided with a projection engaging the inner face of the track rail, and two rollers in different horizontal planes engaging the exterior face of said rail, said track being provided adjacent to the points of meeting of the straight and curved portions thereof, with a curved portion in the plane of one exterior roller, concentric with the outer surface of the curved rail, and a portion in the horizontal plane of the other roller, and in vertical alinement with the outer face of the adjacent straight rail portion.

17. In a shoe polishing machine, the combination with a shoe support, of an endless track surrounding the same, comprising upper and lower track rails, each having parallel straight portions, and curved end portions of greater thickness than the straight portions, connecting the same, traveling brush carriage provided with rollers for engaging each of said track rails and comprising a single roller for engaging the inner face of said rail and two outer rollers in different horizontal planes for engaging the outer face of said rail, said rail being provided adjacent to the meeting points of the straight and curved rail sections with a curved portion concentric with the curved rail section, in line horizontally with one of said exterior rollers, and a straight portion in line with the other exterior roller, and forming a continuation of the outer face of the adjacent straight rail section.

18. In a shoe polishing machine, the combination with a shoe support and an endless track surrounding the same, of a plurality of traveling brush carriages engaging said track, one of said brush carriages being provided with means for supplying blacking to its brush and constituting a dauber brush carriage, means for causing the brush carriages to travel successively around the shoe support, means for imparting movement continuously during the operation of the machine, to the brushes of all of said carriages except the dauber brush carriage and means for operating the brush of the dauber brush carriage only while it is moving adjacent to the shoe support.

19. In a shoe polishing machine, the combination with a shoe support and an endless track surrounding the same, of a plurality of traveling brush carriages engaging said track, one of said brush carriages being provided with means for supplying blacking to its brush and constituting a dauber brush carriage, means for causing the brush carriages to travel successively around the shoe support, a driving wheel on each brush carriage operatively connected with the brush carried thereby, an endless driving device engaging the driving wheels of all the brush carriages except the dauber brush carriage at all times during the travel thereof, and a stationary driving device located adjacent to the shoe support, and in line with the driving device of the dauber brush carriage.

20. In a shoe polishing machine, the combination with a shoe support and an endless track surrounding the same, of a plurality of traveling brush carriages engaging said track one of said brush carriages being provided with means for supplying blacking to its brush and constituting a dauber brush carriage, means for causing the brush carriages to travel successively around the shoe support, a driving wheel on each brush carriage operatively connected with the brush carried thereby, the driving wheel of the dauber brush carriage being located in a different horizontal plane from those of the other carriages, an endless driving chain engaging the driving wheels of all the brush carriages except the dauber brush carriage at all times during the travel thereof, means for continuously operating the said driving chain during the operation of the machine, and a stationary driving device located adjacent to and on both sides of the shoe support, and in the same plane as the driving wheel on the dauber brush carriage.

21. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, and a movable closing device for the open portions of said receptacle.

22. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, a movable closing device for the open portions of said receptacle and means for automatically opening and closing the said movable closing device.

23. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, a movable closing device for the open portions of said receptacle and devices located adjacent to the path of the said receptacle for operating said movable closing device.

24. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, means for positively feeding the blacking through the openings in said receptacle, and a movable closing device for the open portions of said receptacle.

25. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, a stationary radially disposed partition in said casing, and a movable radially disposed blade in said receptacle for feeding the blacking through the open portions of said casing.

26. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, a stationary radially disposed partition in said receptacle, a radially disposed movable blade in said receptacle, means for giving the blade a step-by-step feeding movement, including a pivoted actuating lever and a stationary operating device in the path of said lever for operating the same.

27. In a shoe polishing machine, the combination with a shoe support, of an endless track surrounding the same, a plurality of traveling brush carriages engaging said track, a blacking receptacle carried by one of said brush carriages adjacent to the brush carried thereby, said receptacle having openings on the side adjacent to the brush, a stationary radially disposed partition in said receptacle, a movable radially disposed blade in said receptacle, actuating mechanism therefor, including an actuating lever, and an adjustable stationarily mounted trip in the path of said actuating lever.

28. In a shoe polishing machine, the combination with a shoe support, of an endless track surrounding the same, a plurality of traveling brush carriages engaging said track, a cylindrical blacking receptacle secured to one of said carriages and provided with openings adjacent to the brush, a rotatable closing casing mounted on said receptacle, and provided with an aperture adapted to register with the open portions of the receptacle automatic operating devices for moving said casing into open and closed positions, a radially disposed partition within said casing, a movable radially disposed blade in said casing and automatic operating means for said blade.

29. In a shoe polishing machine, the combination with the shoe support, of an endless track surrounding the same, a traveling brush carriage on said track, an endless chain, for causing the travel of said carriage, sprocket wheels engaging said chain for supporting and driving the same, having teeth of less width than the open links of said chain, and a chain engaging tooth or projection on said carriage located in a different horizontal plane from the teeth of said sprocket wheels for engaging the open links of said carrier chain.

30. In a shoe polishing machine, the combination with a shoe support, of an endless track surrounding the same, a traveling brush carriage mounted on said track, means for effecting the travel of said carriage around the track, an endless driving chain, sprocket wheels engaging said chain for supporting and driving said chain, having teeth of less width than the open links of the chain, a driving sprocket on the brush carriage in a different horizontal plane from the sprocket wheels thereof, for engaging the open links of the chain, and connections between said driving sprocket and the brush carried by said brush carriage.

31. In a shoe polishing machine, the combination with the supporting frame provided with end portions having a horizontal sliding engagement with the main portions of the frame, a shoe support carried by said frame, an endless track carried by said frame, a traveling brush carriage on said track, horizontal endless chains for causing the travel of said carriage and for driving the brush carried thereby, supporting sprocket wheels for said chains, a vertical shaft mounted in the movable end portions of said frame and carrying the sprocket wheels for one end of each of said chains, and means for adjusting the said movable end portions of the frame with respect to the main portion thereof, to adjust the tension of said chains.

In testimony whereof I affix my signature, in the presence of two witnesses.

WILLIAM H. McCONNELL.

Witnesses:
ALVIN B. HUTZLER,
JAMES C. BLASINGAME.

---

Copies of this patent may be obtained for five cents each, by addressing the "Commissioner of Patents, Washington, D. C."